United States Patent [19]

Sugalski

[11] 4,131,722

[45] Dec. 26, 1978

[54] NON-FOULING RESEALABLE VENT

[75] Inventor: Raymond K. Sugalski, Gainesville, Fla.

[73] Assignee: General Electric Company, Gainesville, Fla.

[21] Appl. No.: 894,399

[22] Filed: Apr. 7, 1978

[51] Int. Cl.² .................. H01M 2/02; H01M 2/12
[52] U.S. Cl. .................................. 429/55; 429/82; 137/516.15; 220/209
[58] Field of Search .............. 429/55, 54, 72, 82, 429/176, 53; 220/367, 209; 137/516.15, 860

[56] References Cited

U.S. PATENT DOCUMENTS 3,320,097  5/1967  Sugalski .......................... 429/55

*Primary Examiner*—Anthony Skapars

[57] ABSTRACT

A resealable vented battery container having a sealed casing with a plastic closure having a vent port and a recess on the outside of the closure surrounding the vent port. A metal grommet in the port has a sleeve portion extending through the port with a washer-like surface at the inner end of the sleeve and in contact with the inner surface of the closure around the vent port. A metal rivet, having a head portion at the outer side of the closure and in the closure recess and a stem portion extending through, but spaced from, the wall of the grommet sleeve portion, is upset at its inner end into contact with the grommet washer-like surface. A resilient, O-ring is gripped between the inner side of the rivet head and the bottom wall of the closure recess and expands and stretches when the pressure in the container is increased, venting the excess container pressure from the container.

10 Claims, 5 Drawing Figures

NON-FOULING RESEALABLE VENT

This invention relates to a non-fouling resealable vent for relieving abnormal pressures from an otherwise sealed container and, more specifically, to a non-fouling, self-resealable vent for use with the otherwise sealed container of an electrical device, such as a battery.

Sealed casings heretofore provided for electrical devices, such as rechargeable nickel-cadmium batteries and other electrical devices which may, from time to time generate gases within the sealed container, have included safety vents for releasing or venting gases at abnormal pressures. Such safety vents have usually included a valve maintained in closed position during normal pressure conditions within the container which valve, when abnormal pressure conditions arise, opens to release the pressure. One of the difficulties with such prior art valves has been that, when opened to release abnormal pressure, such valves tend to remain open. Thus the container, which was hermetically sealed before the vent valve was opened by abnormal pressure within the container, remains vented to the atmosphere after the vent valve is opened and after abnormal pressure in the container has been released.

In U.S. Pat. No. 3,320,097 there is shown and described a vent valve for releasing abnormal pressure in container and for resealing such container after abnormal pressure has been released. The arrangement of such patent is adapted for use on a battery cell casing and includes a cylindrical disc of electrical insulating material which forms one end of the cell casing. A metal rivet passes through the cylindrical insulating material disc and, in conjunction with the opening in the disc through which the rivet passes and an "O"ring under the rivet head at the outer side of the disc, forms a resealable pressure relief valve for the cell casing as well as one of the electrical terminals for the cell. The invention of the instant application is concerned with an improvement in the arrangement of such patent.

In the practice of the invention of the patented arrangement, the insulating material disc is most commonly formed with a plastic material, nylon, which is stable, inert, easily formed and an acceptable electric insulating material being preferred. One of the difficulties with such plastic material, however, is its tending to soften and flow. If such plastic material is heated in proximity to the rivet and rivet passage, as might occur because of faulty connection during recharging, such plastic might soften, flow against the rivet and close off the valve passage. Thus, as pressure built up within the battery cell most frequently occurs during recharging, damage to the cell because of excessive pressure might occur. Even if such excessive pressure damage does not occur during such recharging cycle, such damage might occur during subsequent recharging or during use at any time after the valve passage is closed off and excessive pressure conditions should arise.

In the arrangement of the instant invention, the possibility of the valve passage in the device of the '097 patent closing off are avoided by inserting, between the insulating plastic material and the rivet stem, a metal grommet which, through clearance between the grommet and rivet stem or by fluting on the inside diameter of the grommet, provides a space for gas passage irrespective of any heating and softening of the plastic disc.

The invention of the instant application will be more fully understood from the following description, taken with the appended drawings of a preferred embodiment, in which FIG. 1 is a perspective view, partly cut-away and in cross-section, showing a battery cell embodying the vent valve arrangement of the invention;

Figure 1:
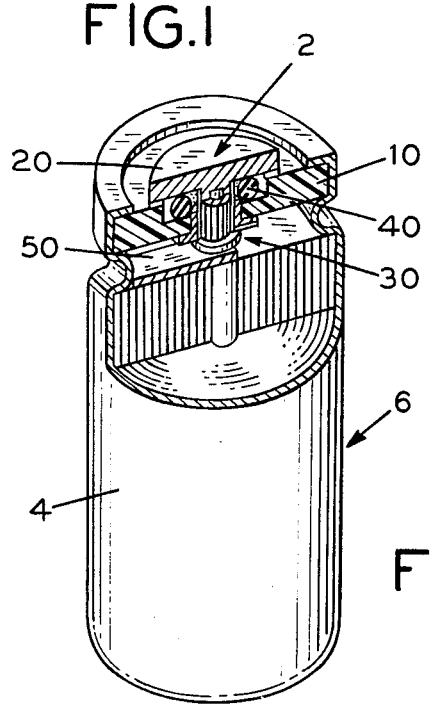
Figure 2:
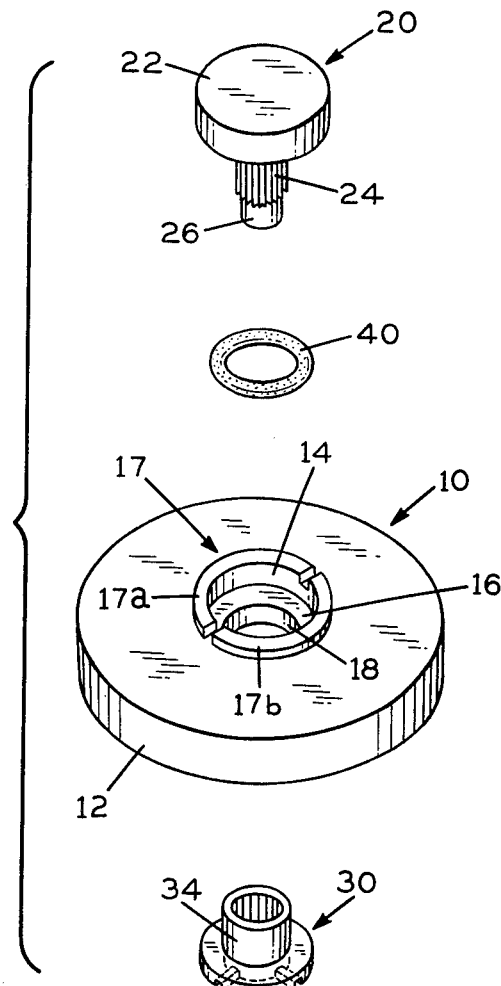
FIG. 2 is an exploded view of the vent valve components of FIG. 1.

Referring to the drawings, the resealable vent, generally designated 2, of the present invention, is mounted on the end of battery case 4 forming, therewith, an enclosure for the battery cell, generally designated 6, housed therein. The side and end wall of case 4 is shaped into gripping contact with the periphery of the vent assembly and form a gas-tight seal therewith.

Referring to FIGS. 2, 3A, 3B, 3C, vent 2 includes a cylindrical body, generally designated 10, of electrical insulating, non-porous plastic material, such as nylon, having an outer periphery 12 for sealing engagement with the side and end walls of casing 4. At its center, body 10 has a recess 14 having a flat bottom wall 16 and surrounding hole 18 passing through body 10 at the center of the body and recess 14. The surface of body 10, around recess 14 is raised at 17 which raised area, at 17a, 17b, is provided with grooves for reasons more apparent later herein.

A metal rivet, generally designated 20, having a head 22, a shank 24 and a reduced shank end 26, passes through hole 18 in cylindrical body 10. For reasons more fully described later herein, head 22 of rivet 20 is slightly larger in diameter than the diameter of recess 14 and seats on raised surface 17 forming therewith a cover over recess 14.

A metal grommet, generally designated 30, having a flat, washer-like portion 32 and an upwardly extending sleeve portion 34 extends upwardly through hole 18 in cylindrical body 10 with sleeve portion 34 of grommet 30 between the O.D. of rivet shank 24 and the wall of through hole 18 and the upper surface of washer portion 32 in contact with the bottom of body 10.

End 38 of rivet is upset over the adjoining edge of the outer surface of washer portion 32 of grommet 30, holding body 10, rivet 20 and grommet 30 assembled. For reasons which will be more apparent later herein, clearance is provided between the O.D. of rivet shank 24 and the I.D. of sleeve portion 34. The I.D. of sleeve portion 34 or the O.D. of rivet shank 24 or both the sleeve I.D. and the shank O.D. might be longitudinally fluted. The bottom surface washer portion 32 of grommet 30 is radially grooved or fluted.

Figure 3A:
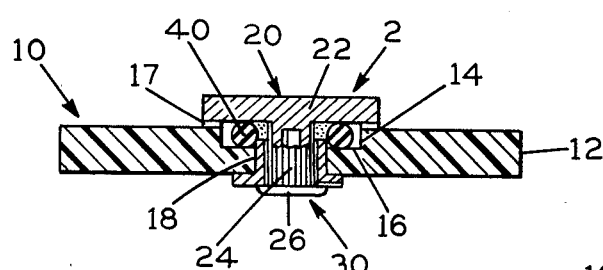
FIGS. 3A, 3B and 3C are enlarged views, in section, of the vent valve assembly of FIG. 1 showing the valve under differing pressure conditions.
Figure 3B:
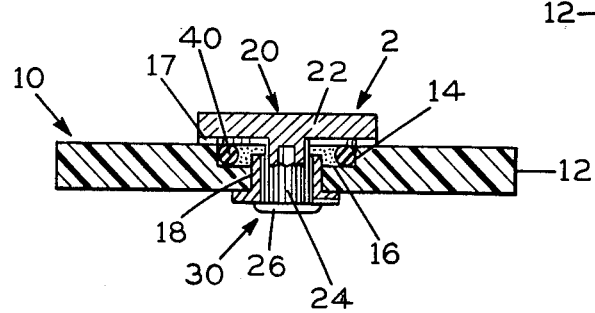
Figure 3C:
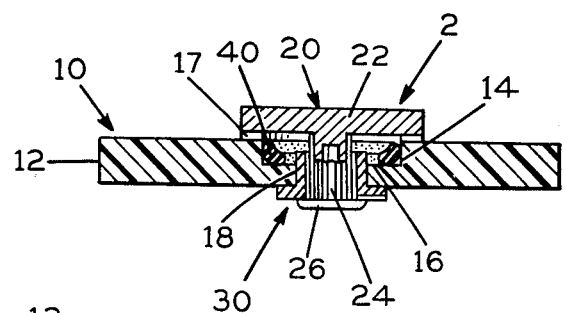

As best shown in FIGS. 3A, 3B, 3C, O-ring 40 is mounted in recess 14 of body 10 between the under surface of rivet head 20 and bottom wall 16 of recess 14. O-ring 40 is of temperature resistant, resilient material, such as neoprene and in its normal, relaxes position, surrounds shank 24 of rivet 20 between the under surface of rivet head 20 and bottom wall 16, forming a gas-tight seal therebetween.

Rivet 20, in the resealable vent arrangement of the present invention, is connected, such as by welding, to conductive metal strip 50 forming, with such strip, the positive terminal of the battery, the negative terminal being formed, in conventional manner, through the metal battery casing.

During normal operation of the battery embodying the resealable vent of the instant invention, pressure within the battery casing is normal, O-ring 40 is relaxed, contracted and compressed between the under surface of rivet head 20 and bottom wall 16 of recess 14. The vent is then closed. Should pressure within the battery casing increase, such increased pressure is applied to the O-ring through the clearance between rivet 20 and grommet 30. The increase in pressure forces O-ring 40 outwardly in recess 14, away from shank 24 of rivet 20 and decreases the cross-section or thickness of the O-ring. This decrease in cross-section or thickness in the O-ring increases the more the pressure increases and the more the O-ring is expanded. The decrease in O-ring thickness, as the O-ring expands, provides a clearance between head 22 of rivet 20 and bottom wall 16 of recess 14, venting gases from the cell. So long as the conditions causing such gases to form or the pressure in the cell to be otherwise above normal conditions, O-ring 40 remains expanded and the cell vented. Once the gas forming conditions pass and pressure within the cell returns to normal, O-ring 40 contracts, re-closing the vent until such time as gases again begin to form and cell pressure increases.

Pressure flow in the resealable vent arrangement of the instant invention is between the metal surfaces of metal rivet 20 and metal grommet 30. Thus, extreme temperature conditions which might occur because of faulty electrical connection between the rivet and charger during charging, or which might occur for other reasons, and might soften and cause the plastic material of the electrical insulating cylindrical body 10 to flow and cut-off gas flow and seal the cell, have little effect on the gas venting and resealing capability of the resealing vent of the instant application.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:
1. A resealable vented container comprising:
   (a) a sealed casing having a plastic closure with a vent port in said closure,
   (b) a metal grommet in said port, said grommet having a washer-like portion on the pressure container side of said closure extending outwardly from and circumferentially around said vent port and a sleeve portion extending through said port,
   (c) a metal rivet member having a head portion at the outer side of said closure and a stem portion integral with said stem portion and extending through, but spaced from the wall of, said sleeve portion of said metal grommet, the inner end of said stem portion being upset onto the washer-like portion of said grommet and holding said rivet member in said grommet, and
   (d) a pressure responsive, resilient member extending around said stem portion of said rivet, between said rivet head portion and the outer side of said closure, said resilient member forming a pressure seal between said rivet head and said outer side of said closure for preventing pressure from escaping from said container past said sleeve portion of said metal grommet and said metal rivet member stem portion when the container pressure increases to allow increased pressure to be vented from said container, past said sleeve and stem portions and past said pressure responsive, resilient means.

2. A resealable vented container, as recited in claim 1, in which the wall of said metal grommet sleeve portion adjacent said stem portion of said metal rivet is fluted.

3. A resealable vented container, as recited in claim 1, in which the wall of said stem portion of said metal rivet adjacent the wall of said metal grommet sleeve portion is fluted.

4. A resealable vented container, as recited in claim 1, in which the wall of said metal grommet sleeve portion adjacent said stem portion of said metal rivet and the wall of said stem portion adjacent the wall of said metal grommet sleeve portion are fluted.

5. A resealable vented container, as recited in claim 1, in which said pressure responsive, resilient member is an O-ring.

6. A resealable vented container, as recited in claim 5, in which the outer surface of said plastic closure around said vent port is recessed and said O-ring is in said recess.

7. A resealable vented container, as recited in claim 6, in which said container houses a battery cell.

8. A resealable vented battery container, as recited in claim 7, in which said metal rivet is one terminal of said battery.

9. A resealable vented battery container, as recited in claim 8, in which said battery terminal is the positive terminal.

10. A resealable vented container, as recited in claim 1 in which the surface of said washer-like portion of said metal grommet in contact with the upset inner end of said metal rivet member stem portion is fluted.

* * * * *